Dec. 28, 1937.  M. L. J. D'ORNELLAS  2,103,666
ANTIFROST DEVICE
Filed March 11, 1937   3 Sheets-Sheet 1
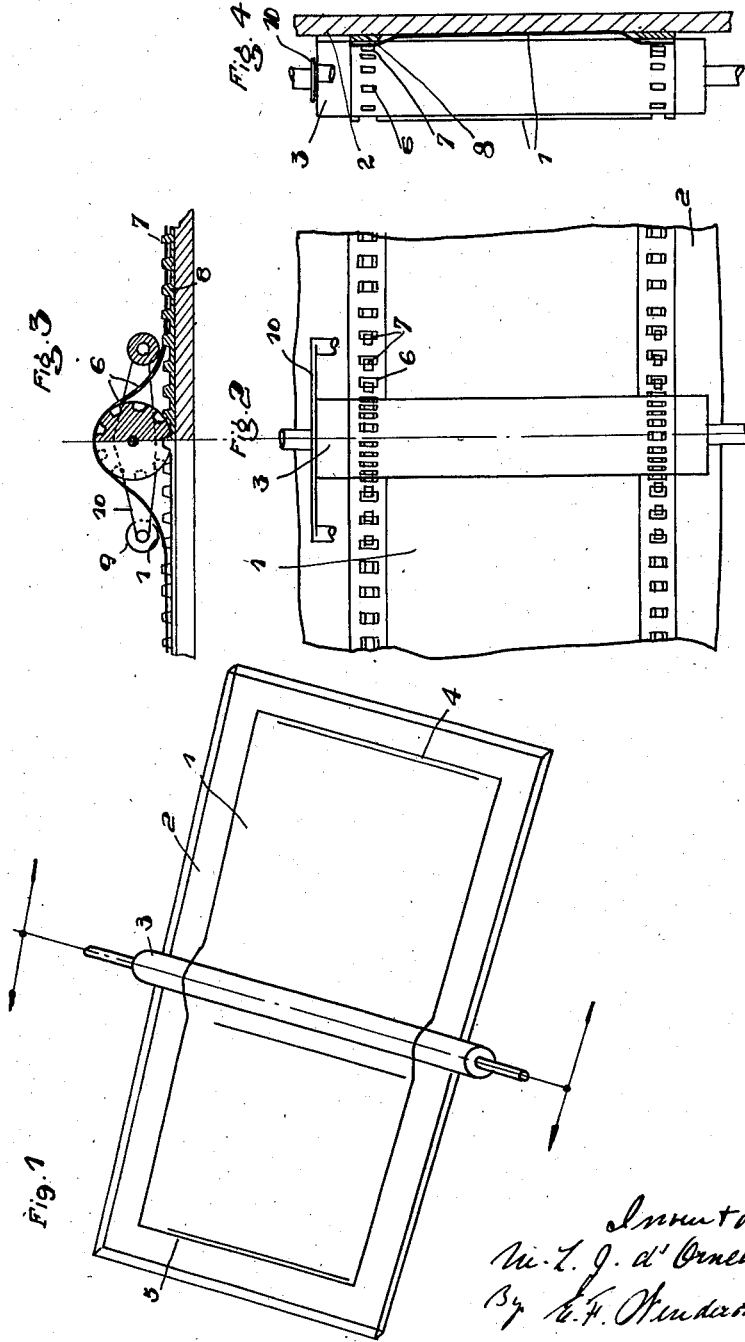

Dec. 28, 1937.   M. L. J. D'ORNELLAS   2,103,666
ANTIFROST DEVICE
Filed March 11, 1937   3 Sheets-Sheet 2
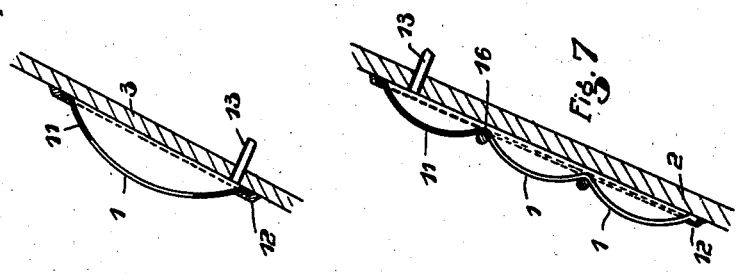
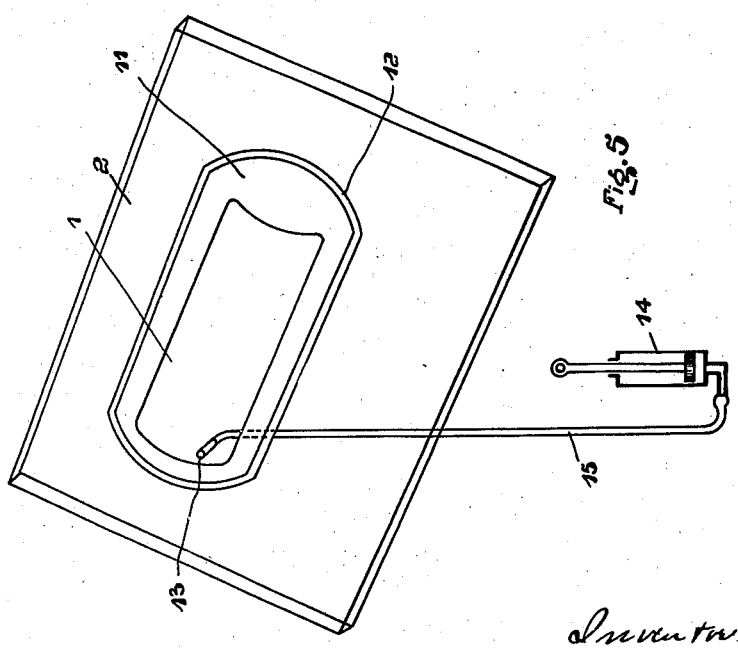

Dec. 28, 1937.  M. L. J. D'ORNELLAS  2,103,666
ANTIFROST DEVICE
Filed March 11, 1937  3 Sheets-Sheet 3
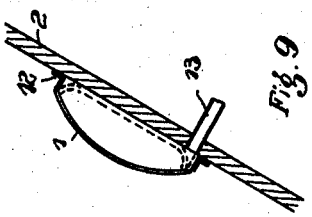
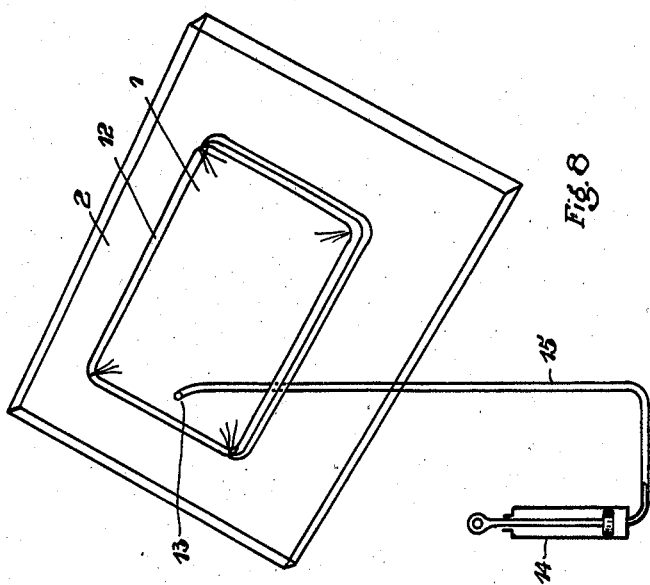

Patented Dec. 28, 1937

2,103,666

UNITED STATES PATENT OFFICE 2,103,666

ANTIFROST DEVICE

Manuel Luis Jose d'Ornellas, Talence, France

Application March 11, 1937, Serial No. 130,406
In France December 17, 1936

15 Claims. (Cl. 20—40.5)

The present invention relates to devices for removing the layer of frost or ice which forms upon transparent surfaces and especially, although not exclusively, the windshields of vehicles, and more particularly airplanes.

The object of my invention is to provide a device of this kind which is better adapted to meet the requirements of practice than those used up to the present time for the same purpose.

The essential feature of the present invention is in providing on the surface to be freed from frost, on the side turned toward the front, a sheet of a supple transparent material, or in constituting this surface by such a sheet of a supple transparent material, and combining said sheet with means for deforming it in such a manner as to break and detach the layer of frost or ice formed on the outer surface of the sheet.

The layer of frost or ice that is thus broken into fragments and detached can drop by itself under the action of the strong air stream produced by the displacement of the vehicle. Or alternately I may provide means for accelerating or completing the removal of said particles of frost or ice.

According to a first embodiment of the invention, the means for deforming the supple sheet of transparent material are mechanical means, such as a roller, a small rod, a vibrator, a hammer or the like.

According to another embodiment of the invention, these means for deforming the supple sheet of transparent material, are pneumatic means, including for instance the action of air under pressure.

In the latter case, according to an advantageous feature of my invention, the deformable transparent sheet is associated with at least one band of an elastic material, for permitting deformation of said band.

In a modification, this band of an elastic material is dispensed with but the sheet of supple material is associated with a frame projecting to a certain distance from the transparent rigid surface against which the supple sheet is normally applied, said supple sheet being fixed to the outer edges of said frame, so as to be normally applied both against said rigid transparent surface and against the inside walls of said frame.

Other features of the present invention will result from the following detailed description of some specific embodiments thereof.

Preferred embodiments of the present invention will be hereinafter described, with reference to the accompanying drawings, given merely by way of example, and in which:

Fig. 1 is a diagrammatical view of a first embodiment of a windshield according to the present invention;

Fig. 2 is a partial front view of a modification;

Fig. 3 is an elevation, partly in section, of this modification;

Fig. 4 is a side view of this modification;

Fig. 5 is a perspective view of another embodiment of the windshield according to the present invention;

Fig. 6 is a cross sectional view of the device of Fig. 5;

Fig. 7 is a sectional view of a modification of the device of Fig. 6;

Fig. 8 is a perspective view of another modification;

Fig. 9 is a cross sectional view of the device of Fig. 8.

In the embodiment of Fig. 1, the device according to the present invention essentially includes a sheet 1, of a transparent material, capable of undergoing certain deformations, which can be fixed to the front surface of the windshield 2, or which might even constitute said surface. The device further includes means for deforming the supple sheet 1.

As diagrammatically shown by Fig. 1, this sheet 1 is fixed to the windshield 2 through two of its opposed sides, for instance sides 4 and 5.

In this embodiment of my invention, the means for deforming the supple transparent sheet 1 are mechanical means. For instance, in the specific embodiment illustrated by Fig. 1, said means consists of a movable roller 6, of any suitable material, adapted to move between sheet 1 and the windshield 2, from one of the fixed sides 4 to the opposite side 5.

This device works in the following manner:

When the windshield of the vehicle is covered with frost or ice, roller 6 is moved with a reciprocating motion which causes it to sweep the whole of the space that is to be freed from frost between the two fixed edges 4 and 5 of sheet 1. During these displacements, the roller raises sheet 1, which curves under it so as to conform to the shape thereof. It follows that the layer of frost or ice which had formed upon the surface of sheet 1 breaks and is partly detached. It is then removed by the air stream created by the displacement of the vehicle, this removal being optionally accelerated or completed by scraping means or any other suitable system.

Obviously, the transparent sheet 1 may be of rectangular shape, as shown by the drawings, or of any other suitable shape. In a likewise manner, the roller may be disposed and moved in any suitable manner and along any desired path.

Furthermore, the transparent sheet 1 may be applied and maintained against the roller through any suitable means, for instance through guides 9 mounted upon a support 10 connected to the spindle of the roller, as shown by Fig. 3. It may be maintained in position upon the windshield 2 in any suitable manner, and, in particular, in the manner illustrated by Figs. 2 to 4 inclusive. In this embodiment of the invention, the transparent sheet is provided with a series of holes 6 along the whole or a portion of its sides that are not fixed to the windshield 2. In these holes are engaged the teeth 7 of racks 8 fixed to the windshield 2. These racks which serve to keep the sheet 1 in position, may also cooperate, either directly or indirectly, with roller 3, as shown by Figs. 2 to 4.

In order to avoid that, when the roller is rotating, too important a friction should take place upon the flexible surface 1, I may provide, between the roller and said surface, other rollers or cylinders which move together with roller 3 and turn about their own axes, without sliding upon surface 1 or with only a slight sliding relative displacement. I may, for instance, drive, together with roller 3, a second roller, of the same diameter, around which the sheet 1 passes and which is caused to turn at the same speed as said roller 3. I may also make use of rollers or cylinders which are mounted loose on the main roller 3.

Of course, what has been said above concerning windshields also applies to any glass panes and other transparent surfaces.

The sheet of transparent supple material designated by reference numeral 1 in the embodiments above described may be made of "cellophane", "celluloid", or any other suitable matter.

In the embodiments illustrated by Figs. 5 to 9 inclusive, the means for deforming the supple sheet 1 are pneumatic means, making use of the action of any suitable fluid, such for instance as air, for breaking and detaching the layer of frost or ice.

In the examples illustrated by Figs. 5, 6 and 7, the sheet 1 of any transparent supple material is associated, along either the whole of its periphery or only one or several of its sides, with a band 11 of a fluidtight elastic material (such as rubber for instance). The outer edge of this band is fixed by means of a fluidtight frame 12 secured to the windshield, in such manner that, when the device is in the state of rest, the whole of the sheet 1 and of its connecting band 11 is kept flat against the windshield 2. I further provide an orifice 13 affording a communication between the space between the windshield 2, the transparent sheet 1, with the band 11 surrounding it, and the frame 12 and any suitable pump or pulsating device 14 connected with orifice 13 through a pipe 15.

When the windshield of the vehicle is covered with frost, this pump or equivalent device 14 is set into play, in such manner as to periodically inflate the space between the windshield 2 and the system including parts 1, 11 and 12.

Under the effect of the pressure of the fluid the elastic band 11 is elongated in such manner that the whole of 1 and 11 assumes a bulging shape which causes the ice or frost that had formed upon its outer surface to crack. The frost or ice that is thus broken is driven off by the air stream resulting from the movement of the vehicle or through any suitable accessory means.

According to a modification shown by Fig. 7, I further provide stationary rollers or bars 16, arranged either transversely or longitudinally, which compel the sheet 1 to deform in such manner as to form several bulging projections between said rollers or bars 16.

Of course, the examples of embodiments of the invention that have been described should be considered as not limiting in any way the scope of the invention, since it is clear that other specific arrangements could be provided within the scope of the invention.

In particular, the flexible sheet 1 can be fixed in any suitable manner on the windshield. This sheet 1, same as bands 11, can be made of any shape that is found to be advantageous, and the relative positioning of the system on the windshield can vary according to the circumstances. The same applies to rollers or bars 16.

As for the fluid that is used for deforming the supple sheet 1, it can be dried, heated, filtered, etc., with a view to obtaining this deformation under the best possible conditions.

The system for feeding the fluid under pressure may consist of any compressor, for instance a reciprocating pump driven in any suitable manner. In particular, this pump may be driven by the suction of the engine of the vehicle.

The windshield itself can be constituted by a transparent supple sheet which is not superposed to a glass pane. In this case, the sheet is a double sheet and the fluid under pressure is fed to the space between the sheet elements.

Finally, in the embodiment illustrated by Figs. 8 and 9, the elastic band 11 above referred to is dispensed with. In this case, the supple transparent sheet 1 is fixed in a fluidtight manner (Fig. 9) to the outer edges of a frame 12 extending to a certain height from the surface of the windshield. This frame 12 is fixed in a fluidtight manner to said surface of the windshield. As in the preceding embodiments (Figs. 5, 6 and 7) a pump or compressor 14 feeds, through a pipe 15, opening through a conduit 13 to the front face of the windshield, the fluid under pressure intended to deform this sheet 1.

This device works in the following manner:

When no fluid is fed through passage 13, the transparent supple sheet is applied against the windshield under the effect of the air-stream resulting from the motion of the vehicle (as shown in dotted lines in Fig. 9), accessory means, such as springs or rubber threads, eventually cooperating in applying the supple sheet against the windshield.

Owing to the fact that the edges of the supple sheet 1 are fixed to frame 12 at a certain distance from the windshield, when fluid under pressure is fed through conduit 13 said sheet can bulge outwardly as shown in solid lines in Fig. 9.

Of course, according to the present invention which, as above stated, is not in any way limited to its application to windshields but can be used in connection with glass panes or any other transparent surfaces, it is possible to make use of several anti-frost elements disposed side by side and actuated either simultaneously or alternately, or independently, either by the same pump or pulsating device or by separate pumps.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A system which comprises, in combination, a rigid transparent element, at least one transparent sheet of a supple material arranged to be normally applied flat against the outer surface of said rigid transparent element, and means for deforming said sheet in such manner as to break any layer of frost or ice as may have formed thereon.

2. A system which comprises, in combination, a rigid transparent element, at least one transparent sheet of a supple material arranged to be normally applied flat against the outer surface of said rigid transparent element, and mechanical means, interposed between said sheet and said rigid element, for deforming said sheet in such manner as to break any layer of frost or ice as may have formed thereon.

3. A system which comprises, in combination, a rigid transparent element, a transparent sheet of a supple material applied in a fluidtight manner along its whole periphery against said transparent rigid element and arranged to be normally applied flat against the outer surface of said transparent rigid element, and means for injecting a fluid under pressure between said sheet and said element for deforming said sheet in such manner as to break any layer of frost or ice as may have formed thereon.

4. A system according to claim 3 further including an elastic band running along at least one side of said sheet and arranged to connect said sheet with said rigid element along said side, so as to permit deformation of said sheet.

5. An anti-frost device for use in connection with a transparent element and especially a windshield, which comprises, in combination, a transparent sheet of a supple material adapted to be fixed along at least two opposite sides of its periphery to the outer surface of said transparent element, and means for deforming said sheet in such manner as to break any layer of frost or ice as may have formed thereon.

6. An anti-frost device for use in connection with a transparent element and especially a windshield, which comprises, in combination, a transparent sheet of a supple material adapted to be fixed along at least two opposite sides of its periphery to the outer surface of said transparent element, and mechanical means, interposed between said sheet and said transparent element, for deforming said sheet in such manner as to break any layer of frost or ice as may have formed thereon.

7. An anti-frost device for use in connection with a transparent element, and especially a windshield, which comprises, in combination, a transparent sheet of a supple material adapted to be fixed along at least two opposite sides of its periphery to the outer surface of said transparent element, and a roller parallel to said sides interposed between said sheet and said transparent element, adapted to be moved between said sides of the sheet so as to deform it in such manner as to break any layer of frost or ice as may have formed thereon.

8. An anti-frost device according to claim 7 which further comprises a couple of rollers and a support for said last mentioned rollers pivoted to the first mentioned roller arranged in such manner that the two second mentioned rollers are applied against the outer face of said supple sheet on either side of said first mentioned roller, so as to keep said sheet applied against said first mentioned roller.

9. An anti-frost device according to claim 7 which further comprises two racks parallel to each other and disposed along the sides of said sheet that are not fixed to said rigid transparent surface, said last mentioned sides of the sheet being provided with holes adapted to engage in the teeth of said racks, respectively, and means for engaging said holes on said teeth on either side of said roller.

10. An anti-frost device according to claim 7 which further comprises two racks parallel to each other and disposed along the sides of said sheet that are not fixed to said rigid transparent surface, said last mentioned sides of the sheet being provided with holes adapted to cooperate with the teeth of said racks, respectively, means for engaging said holes on said teeth on either side of said roller, said roller being provided with recesses adapted to cooperate with the teeth of said racks, respectively.

11. An anti-frost device for use in connection with a transparent element and especially a windshield, which comprises, in combination, a transparent sheet of a supple material adapted to be fixed in a fluidtight manner along the whole of its periphery to said transparent element, and means for injecting a fluid under pressure between said sheet and said transparent element so as to deform said sheet in such manner as to break any layer of frost or ice as may have formed thereon.

12. An anti-frost device for use in connection with a rigid transparent element and especially a windshield, which comprises, in combination, a transparent sheet of a supple material, a band of an elastic material attached to said sheet along at least one side thereof and adapted to be fixed in a fluidtight manner to said rigid element, and means for injecting a fluid under pressure between said sheet and said transparent element so as to deform said sheet in such a manner as to break any layer of frost or ice as may have formed thereon.

13. An antifrost device according to claim 12 further including a plurality of elongated elements running across said sheet on the outer side thereof and at a small distance therefrom, whereby said sheet comes into contact with said elongated elements when inflated by said fluid.

14. An anti-frost device according to claim 11 in which said means for injecting a fluid under pressure between said sheet and said transparent element are so constructed as to act in a pulsatory manner, in such manner as to impart a reciprocating deformation movement to said sheet.

15. An anti-frost device for use in connection with a rigid transparent element and especially a windshield, which comprises, in combination, a frame having walls projecting from the front surface of said transparent element, a transparent sheet of a supple material fixed along its whole periphery to the walls of said frame at a distance from said front surface, said sheet being so dimensioned that it can be applied flat against the front surface of said transparent element in the portion of the area thereof limited by said frame, and means for injecting a fluid under pressure between said sheet and said portion of said rigid transparent element.

MANUEL LUIS JOSE D'ORNELLAS.